United States Patent [11] 3,595,116

[72] Inventor Dixie E. Gilbert
 Bartlesville, Okla.
[21] Appl. No. 850,802
[22] Filed Aug. 18, 1969
[45] Patented July 27, 1971
[73] Assignee Phillips Petroleum Company

[54] SEVERING BLADE WITH BEVELED GRIPPING EDGE
 8 Claims, 7 Drawing Figs.
[52] U.S. Cl. ................................................ 83/176,
 83/54, 83/170, 83/375, 83/465, 83/623
[51] Int. Cl. ..................................................... B26d 7/02,
 B26d 7/08
[50] Field of Search .......................................... 83/19—21,
 9, 15, 16, 176, 170, 623, 375, 382, 456, 453, 465,
 51, 54

[56] References Cited
 UNITED STATES PATENTS
 1,617,511 2/1927 Balch ............................. 83/19
 2,712,169 7/1955 Buttress .......................... 83/51 X
 2,825,405 3/1958 Maass et al. .................... 83/623

Primary Examiner—James M. Meister
Attorney—Young and Quigg

ABSTRACT: Square cuts are obtained in thermoplastic tubing and the like by means of closing cooperating gripping jaws on the tubing, which jaws have a leading cutting edge and an offset gripping edge which slopes back to an outer surface of the blade.

PATENTED JUL 27 1971 3,595,116

INVENTOR.
D. E. GILBERT
BY Young & Quigg
ATTORNEYS

SEVERING BLADE WITH BEVELED GRIPPING EDGE

BACKGROUND OF THE INVENTION

This invention relates to apparatus for severing thermoplastic tubing and the like.

In certain special applications, it is highly desirable to obtain a square cut when severing pipe and tubing. For instance, in the formation of bottles and other hollow objects from preformed parisons, it has been found preferable to extrude a continuous length of tubing and thereafter cut this tubing into individual segments for subsequent blow molding. It is apparent that at least the end of the parison which is to form the neck of the resulting article, particularly in the case of bottles having screw tops, must not be cut at an angle or else the cap will not fit properly. While it is possible to obtain a square cut with a saw, this entails certain disadvantages. Among these are the problems with "sawdust" formed by the cutting operation, which is both a maintenance problem and an economic waste unless it is recovered and reused. Also, if the tubing is to be severed as it is extruded, elaborate means must be provided to move the saw blade axially along with the tubing until it is severed.

SUMMARY OF THE INVENTION

It is an object of this invention to achieve a square cut in severing a thermoplastic tube.

It is a further object of this invention to provide a more economical means to sever pipe and the like.

It is yet a further object of this invention to provide apparatus to grip and sever a thermoplastic tube or the like.

In accordance with this invention, thermoplastic tubing or the like is severed by means of cooperating blades which have a sharp leading edge and a gripping edge offset slightly from said sharp leading edge, said gripping edge sloping back to an outer surface of said blade.

BRIEF DESCRIPTION OF THE DRAWINGS

In the drawings, forming a part hereof wherein like reference characters denote like parts in the various views.

DESCRIPTION OF THE PREFERRED EMBODIMENTS

Figure 1:
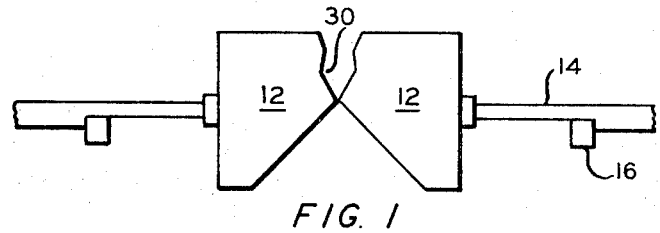
FIG. 1 is a side elevational view of two cooperating blades in accordance with the instant invention.
Figure 4:
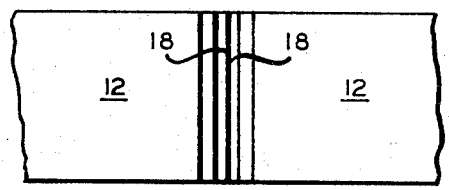
FIG. 4 is a top view of the blades of FIG. 1.

The cutting mechanism of the instant invention can be used for severing thermoplastic tubular pipe, channel, and the like. While it will generally be utilized in the severing of round tubular material, it can also be utilized for severing hollow elongated shapes which are not cylindrical, such as those having square or triangular cross sections. The invention is applicable for severing tubular material made of any thermoplastic material and is particularly suitable for severing tubular material made of polymers of at least one mono-1-olefin having 2—8 carbon atoms per molecule and poly(vinyl chloride), more preferably polypropylene.

The tubing can be severed in accordance with the instant invention immediately after solidifying an extrusion by placing the severing mechanism downstream from the cooling bath of the extruder and severing the tubing as it is extruded. Alternatively, the tubing can be severed initially into sections of comparatively great length and stored and thereafter cut up into workpieces of the desired length.

The tubular material must be heated to a temperature sufficient to prevent the polymer from shattering, and yet not sufficiently high that it will be tacky or lose its shape. Particularly with polypropylene, it is essential to heat it to a temperature at which it will not shatter, this temperature for polypropylene being from 200°—335° F., preferably 290°—320° F. Broadly speaking, the proper temperature would be that between the temperature at which the polymer shatters and a temperature about 5°—20° below its crystalline melting point (or softening point in the case of amorphous polymers). For PVC, a broad temperature of 150°—320° F., more preferably about 210°—260° F. is suitable.

In this regard, it is noted that quite surprisingly in accordance with the instant invention, the tubing is severed without sealing, even though for many of the polymers, the temperature utilized is the same as is utilized in very similar operations involving sealing with an apparatus similar to that of the instant invention, except without the beveled gripping edge.

The severing blades may close at any commercially feasible speed; generally, the blades will close during at a time interval of between 0.01 and 5 seconds, preferably between 0.05 and 0.02 seconds.

The severing blades can be made of any suitable metal. A preferred material is Vega steel hardened to a 59—61 Rockwell C hardness. In a preferred embodiment, the blades are so carried by the means utilized for advancing and retracting them, that when fully advanced, the blades project between 1 and 2 mils beyond the theoretical centerline separating the two blades. This accounts for slight inaccuracies in alignment and it has been found by experimental results that such an arrangement achieves a good cut in every instance whereas, without the overlap, a slight film may be left between the cutting edges of the blade members. It has been found by actual tests that blades impinging under such an operation utilizing the Vega steel are surprisingly resistant to dulling and can be operated for as much as a million cycles or move without sharpening.

Referring now to the drawings, in FIG. 1 there is shown a pair of matching opposed severing blades 12. Arm means 14 is adapted to reciprocate said blades forward into engagement as shown in this FIGURE and backward to allow insertion of the tubular material to be severed. Stop means 16 is adjusted so as to allow the blades to move forward to the desired extent, preferably to the point where cutting edge 18 (see FIG. 2) of each blade extends past the theoretical centerline separating the two blades a distance of 1 to 2 mils.

Figure 2:
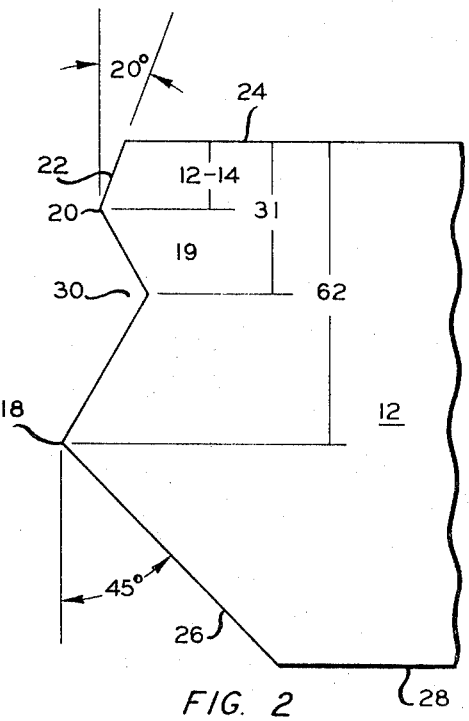
FIG. 2 is a side elevational view enlarged somewhat to show detail of one blade.

Referring now to FIG. 2, which shows blade 12 in greater detail, this blade is shown to have a leading cutting edge 18 and a gripping edge 20. Gripping edge 20 is offset slightly back from cutting edge 18. A surface 22 of blade 12 slopes back from gripping edge 20 to outer surface 24 of blade 12, which in this instance is disposed in such a relationship that surface 24 is the top surface. As shown in the figure, this surface slopes back at an angle from a plane perpendicular to gripping edge 20 at an angle of 20°. This angle is critical to the operation of the invention and must be within the range of 5°—60°, preferably within the range of 10°—30°. Surface 26 of blade 12 slopes back from cutting edge 18 to outer surface 28 of blade 12. As shown in the drawing, this surface slopes back at an angle of 45° to a plane perpendicular to the cutting edge. This angle is preferably within the range of 40°—60°; however, it can be as low as 30° and can be as high as 90°, that is, cutting edge 18 can be flush with bottom surface 28. Between cutting edge 18 and gripping edge 20, the blade is recessed to form recess 30.

As shown in FIG. 2, the distance from cutting edge 18 to surface 24 is 62 mils with point 19 being 31 mils below surface, although these exact dimensions are not critical. Generally, the distance between edge 18 and surface 24 will be about 40 to 200, preferably 50 to 100, mils.

The configuration described hereinabove is essential to the operation of the invention. It is essential to have a gripping edge 20 as opposed to simply bringing two knife edges together. This is because if two knife edges are brought together in a blade not having gripping edge such as those represented by reference character 20, the tubing will twist slightly as it is being cut and thus an uneven cut will result. The effect of gripping edges 20 is to hold the parison square while it is being cut. A blade having a cutting edge and a gripping edge which is flush with the upper surface, such as is shown in the upper portion of FIG. 6 results in a seal in many instances, for instance with polypropylene at a temperature as much as 50° below the crystalline melting point, a seal will result.

The discovery that beveling off the gripping edge will result in the tubing being severed and immediately opening back up without being sealed was totally unexpected and is not completely explainable. Apparently, the upward component of force directed against the upper portion of the tubing by surface 22 causes the tubing to pull out of the severing blades immediately on their closure just as would occur if gripping edge 20 were not present. The length of surface 22, i.e., from edge 20 to the point where it intersects surface 24 must be at least 10 mils. Generally, it will be within the range of 10 to 100 mils, preferably 12 to 50 mils. In this way, the advantage of gripping edge 20 to align the tubing is achieved without the disadvantage of it causing the tubing to seal. For this reason, the angle of surface 22 to the horizontal is critical. As stated hereinabove, this angle must be within the range of 5°—60°, preferably 10°—30°. It is apparent that as this angle approaches 90°, the configuration approaches that shown in the upper portion of FIG. 6, which configuration results in a seal rather than severing without sealing.

When severing jaws 12 are fully extended as shown in FIG. 1, gripping edges 20 are in opposed relationship and spaced apart a distance which is preferably within the range of 0.1 to 0.4, the wall thickness of the workpiece. For instance, with a polypropylene tube of 0.125-inch wall thickness, these edges will be spaced apart a distance within the range of 13—50 mils, preferably about 18—25 mils.

Figure 5:
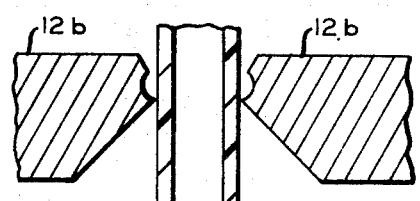
FIG. 5 is a sectional view of blades similar to those of FIG. 1 showing a different configuration of the severing and gripping area.

The other angles are not critical and indeed, as shown in FIG. 5, the recess can be in the from of a curve instead of the shape shown in the other FIGURES.

As stated hereinabove, the purpose of the gripping edge 20 is to maintain the workpiece in alignment while the edge 18 is severing it. A single pair of gripping edges is sufficient as shown in FIG. 1. A square cut is obtained using the apparatus of FIG. 1 with no sealing of either the section of tubing disposed above the cutting edges or the section disposed below. The section above the cutting edges is not sealed because of the beveled surface 22. The portion below is not sealed because there is no gripping edge at all to cause it to be compressed together and sealed.

Figure 3:
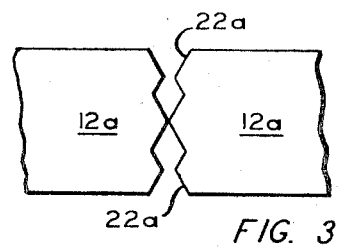
FIG. 3 is a side elevational view of a pair of cutting blades having symmetrically disposed gripping edges.

However, while a single gripping edge is sufficient to hold the parison in alignment, the severing blades 12a can have symmetrically disposed gripping edges above and below a cutting edge, each of said gripping edges having sloping surface 22a, as shown in FIG. 3.

FIG. 5 shows severing blades 12b wherein the recessed area is curved.

Figure 6:
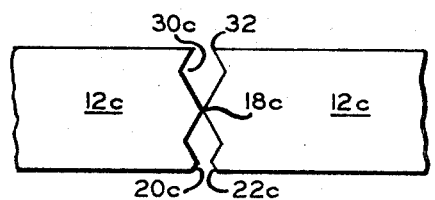
FIG. 6 is a view of an alternate embodiment of the invention.

FIG. 6 shows an alternate embodiment of the instant invention wherein a thermoplastic tubular length can be severed and the portion above the severing line sealed to form a closed end parison and the portion below the severing line left open. In this figure, there is shown severing jaws 12c with cutting edges 18c. Below cutting edges 18c are gripping edges 20c, each of which has a sloping surface 22c. This configuration is identical to that of FIG. 1, and thus results in the tubing being severed, but the separated portion below the severing line opening back up as opposed to being sealed. Above cutting edge 18c, however, is gripping edge 32 which does not have a beveled or sloping surface, but rather is flush with the upper or outer surface of blade 12c. With this configuration, a portion of the thermoplastic material is trapped in recess 30c and is compressed so as to form a seal so that the separated portion of the tube above cutting edge 18 is sealed. Utilizing this apparatus, a continuous length of thermoplastic tubing can be extruded and as the blades are closed, parisons are formed having an open end and a closed end with no waste material being formed.

Figure 7:
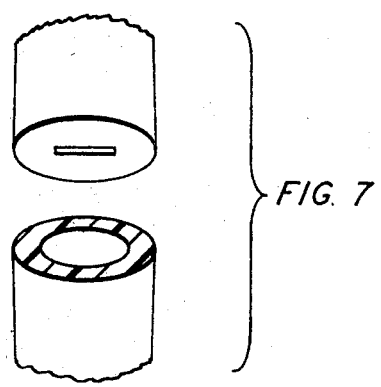
FIG. 7 is a perspective view of tubing severed with the apparatus of FIG. 6.

FIG. 7 shows a section of tubular material which has been cut with the blade of FIG. 6. In this FIGURE, the sections of tubing have been cocked at an angle to show the sealed upper portion and the severed and unsealed lower portion.

Of course, the spectacular results shown in FIG. 7 wherein one end of the parison is sealed and the other severed without sealing can only be accomplished with certain materials operating at certain temperatures, for instance, polypropylene at a temperature in the neighborhood of 290°—320° F. However, the invention has wide applicability to a wide range of polymers so far as the principal embodiment of utilizing the beveled gripping edge to effect severing without sealing is concerned. That is, with certain polymers and certain temperatures, blades such as is shown in FIG. 6, while effecting a severing without sealing operation on the lower half, may effect only a partial seal or distortion of the upper portion.

EXAMPLE I

Polypropylene homopolymer having a density of 0.905 (ASTM D 1505–63T), a melt flow of 2 (ASTM D 1238–62T, Condition L), and a crystalline melting point of 450° F. was extruded into tubing having an internal diameter of 0.8-inch and a wall thickness of 0.125-inch. The tubing was cooled to room temperature and cut into 7-inch lengths. These 7-inch lengths were heated to a temperature of 320° F. and severing jaws identical to those shown in FIGS. 1 and 2 were closed upon a section of this tubing at a speed sufficient to give a closing time of 0.1 of a second. The distance between gripping edges 20 as the sealing blades were fully advanced was 20 mils. The tubing was cut square and cleanly and both the severed section above and below the cutting edges popped open and immediately regained an essentially round configuration.

Identical polymer heated to the identical temperature was placed between identical jaws except that the upper edge of the gripping jaw was not beveled, that is, the jaw had the configuration of FIG. 1 except that surface 22 extended up to where the gripping edge was flush with upper surface 24. That is, this area had the configuration as shown in the upper portion of the jaw of FIG. 6. The severed section of the tubing above cutting edge 18 was sealed sufficiently to give a watertight seal.

EXAMPLE II

Polyethylene was extruded into tubing of the same dimensions as that of Example I and severed with an apparatus identical to that used in Example I, that is, apparatus such as is shown in FIG. 1. The tubing was heated to a temperature of about 5° below the crystalline melting point. As in Example I, the tubing was severed without sealing. Similar tubing was formed from unplasticized poly(vinyl chloride) and severed with an apparatus identical to that used in Example I, that is, as shown in FIG. 1. This tubing was heated to a temperature of 220° F. The poly(vinyl chloride) tubing also was severed without sealing.

While this invention has been described in detail for the purpose of illustration, it is not to be construed as limited thereby, but is intended to cover all changes and modifications within the spirit and scope thereof.

I claim:

1. Apparatus for severing a thermoplastic tubular workpiece comprising in combination: a pair of cooperating matching blades, each of said blades having a leading cutting edge, a gripping edge offset slightly back from said cutting edge, a surface sloping back from said gripping edge at an angle of 5°—60° from a plane perpendicular to said gripping edge to an outer surface of said blade; and wherein said gripping edge and cutting edge are spaced apart and separated by a recessed area.

2. An apparatus according to claim 1 wherein said surface slopes back from said gripping edge at an angle of 10°—30°.

3. An apparatus according to claim 1 wherein said matching gripping edges are separated by a distance of 13—50 mils when in fully closed position.

4. An apparatus according to claim 1 wherein a surfaces of said blade adjacent said cutting edge on a side opposite from said gripping edge forms an angle with a plane perpendicular to said cutting edge of between 40° and 60°.

5. An apparatus according to claim 1 comprising in addition a second gripping edge disposed on the opposite side of said cutting edge, said second gripping edge being offset slightly back from said cutting edge, said blade having a surface sloping back from said second gripping edge at an angle of 5°—60° from a plane perpendicular to said gripping edge to a second outer surface of said blade, said second outer surface being spaced parallel to said first outer surface, said second gripping edge being spaced apart from said cutting edge and separated by a recessed area.

6. An apparatus according to claim 1 wherein said recesses area is curved.

7. An apparatus according to claim 1 comprising in addition a second gripping edge on the opposite side of said cutting edge from said first gripping edge, said second gripping edge being offset slightly back from said cutting edge, and separated therefrom by a recessed area, said second gripping edge being flush with a second surface of said blade, said second surface being parallel to said first surface.

8. An apparatus according to claim 1 comprising in addition, means to move said blades into and out of engagement, said means having stop means to stop forward movement of said blades at a point where said cutting edge of each blade projects 1 to 2 mils past a centerline between said blades.